US007225195B2

(12) United States Patent
Avrahami et al.

(10) Patent No.: US 7,225,195 B2
(45) Date of Patent: May 29, 2007

(54) METHOD FOR A DYNAMIC INFORMATION MESSAGING SYSTEM

(76) Inventors: Gil Avrahami, 2 Binlik Street, Rishon Le-Zion (IL); Eran Sagi, 26 Ben Yosef Street, Tel Aviv 69125 (IL); Shahar Zer, Moshav, Beit-Shearim 30046 (IL)

( * ) Notice: Subject to any disclaimer, the term of this patent is extended or adjusted under 35 U.S.C. 154(b) by 504 days.

(21) Appl. No.: 10/650,017

(22) Filed: Aug. 27, 2003

(65) Prior Publication Data
US 2005/0172007 A1     Aug. 4, 2005

(51) Int. Cl.
*G06F 17/30* (2006.01)
(52) U.S. Cl. .................. 707/101; 707/10; 707/102; 707/103 R; 709/201; 709/217
(58) Field of Classification Search .............. 707/2, 707/3, 5, 6, 10, 101, 102, 103 R; 709/201, 709/217
See application file for complete search history.

(56) References Cited

U.S. PATENT DOCUMENTS

| | | | | |
|---|---|---|---|---|
| 5,794,229 A | * | 8/1998 | French et al. ................... | 707/2 |
| 5,918,225 A | * | 6/1999 | White et al. .................... | 707/3 |
| 5,918,232 A | * | 6/1999 | Pouschine et al. ....... | 707/103 R |
| 5,940,818 A | * | 8/1999 | Malloy et al. ................. | 707/2 |
| 5,943,677 A | * | 8/1999 | Hicks ......................... | 707/205 |
| 5,978,788 A | * | 11/1999 | Castelli et al. ................. | 707/2 |
| 6,003,036 A | * | 12/1999 | Martin ......................... | 707/102 |
| 6,078,924 A | * | 6/2000 | Ainsbury et al. ........... | 707/101 |
| 6,115,714 A | * | 9/2000 | Gallagher et al. .......... | 707/100 |
| 6,163,774 A | * | 12/2000 | Lore et al. ................. | 705/36 R |
| 6,275,824 B1 | * | 8/2001 | O'Flaherty et al. ............ | 707/9 |
| 6,279,033 B1 | * | 8/2001 | Selvarajan et al. ......... | 709/217 |
| 6,317,750 B1 | * | 11/2001 | Tortolani et al. ....... | 707/103 R |
| 6,567,796 B1 | * | 5/2003 | Yost et al. ..................... | 707/2 |
| 6,768,986 B2 | * | 7/2004 | Cras et al. ..................... | 707/2 |
| 6,915,286 B2 | * | 7/2005 | Policastro et al. ............. | 707/1 |
| 6,920,474 B2 | * | 7/2005 | Walsh et al. ................ | 709/200 |
| 7,003,560 B1 | * | 2/2006 | Mullen et al. .............. | 709/223 |
| 7,035,840 B2 | * | 4/2006 | Nakos et al. .................. | 707/2 |

* cited by examiner

*Primary Examiner*—Shahid Al Alam
(74) *Attorney, Agent, or Firm*—Martin Fleit; Paul D. Bianco; Fleit Kain Gibbons Gutman Bongini & Bianco, P.L.

(57) ABSTRACT

A method and system for exchanging online data information messages between at least two computer terminal nodes through data communication networks. Each data information message includes a definition of an online information data structure, a query syntax, a data query, a definition of data information navigation techniques such as sorting, filtering, On-Line Analytical Processing (OLAP) operations and data-mining or data-warehousing techniques, and a definition of information representation methods such as graph, a map, a summary table or a data records table. The information messages can be browsed and navigated through online data results and their graphical representation based on said information message definition, wherein the data is retrieved from at least one common database.

64 Claims, 14 Drawing Sheets

Fig. 1A
Apartments for rent all over USA – MAP representation
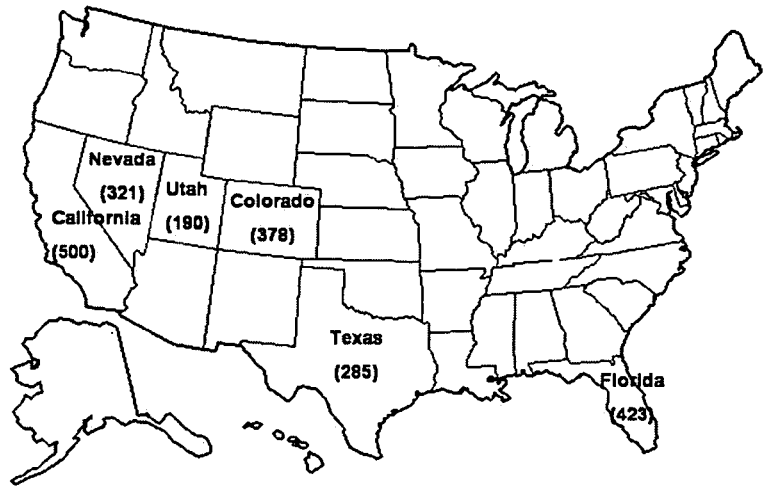
Fig. 1B
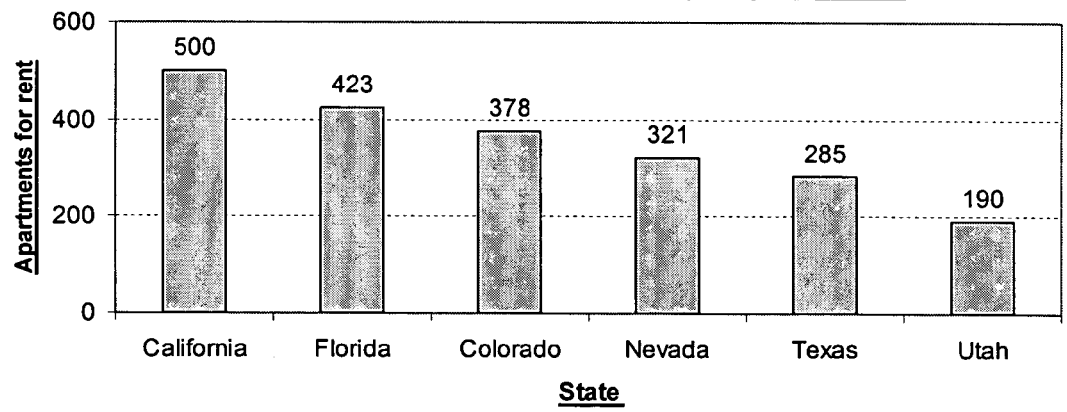
Fig. 1C
Apartments for rent all over USA – Summary Table representation
| State | Apartments for rent |
|---|---|
| California | 500 |
| Florida | 423 |
| Colorado | 378 |
| Nevada | 321 |
| Texas | 285 |
| Utah | 190 |

Apartments for rent in Palo-Alto – Data Table

|  |  | Record # | Address | Bed Rooms | Rental Period | Owner Phone Number | Apartment Picture |
|---|---|---|---|---|---|---|---|
| ☐ |  | 1 | 14 G. Washington St. | 3 | 6 months | 456-555-6654 | None |
| ☐ |  | 2 | 25 G. W. Bush St. | 4 | 24 months | 456-555-6546 | www.abc.com |
| ☐ |  | 3 | 133 Roosevelt St. | 2 | 12 months | 845-555-1313 | www.abcd.com |
| ☐ |  | 4 | 522 Alamida St. | 3 | 12 months | 235-555-3651 | www.abcd.com |
| ☐ |  | 5 | 223 Birmingham St. | 3 | 12 months | 933-555-5651 | www.abcde.com |

Figure-2

FIG. 5A
Apartments for rent all over USA

| State | Apartments for rent |
|---|---|
| California | 500 |
| Florida | 423 |
| Colorado | 378 |
| Nevada | 321 |
| Texas | 285 |
| Utah | 190 |

FIG. 5B
Apartments for rent all over USA
(Where State= "California")

| City | Apartments for rent |
|---|---|
| San Francisco | 153 |
| Los Angeles | 140 |
| Sacramento | 112 |
| San Jose | 90 |
| Palo Alto | 5 |

Modified Information Message

1. Unique ID.
2. Basic Information Message unique ID.
3. Additional database query syntax.
4. Last used representation method.
5. Last used navigation techniques.
6. Marked Records ID's list.
7. Limitations on Information Navigation Techniques.
8. Limitations on Information Representation Methods.
9. Actual addressees.
10. Sender ID.
11. Online/Offline indicator.
12. Offline message data.

Figure-11

METHOD FOR A DYNAMIC INFORMATION MESSAGING SYSTEM

BACKGROUND

Two major categories of electronic information transmission are presently available and widely used. The first category of messages is text-based messages. These types of messages may be transferred from one person to another or from one person to a group of people via services such as e-mail or SMS (Short Message Service). The second category is file messages, i.e. transferring any type of file or files such as text documents, electronic sheets, presentations, pictures, video, or audio that may be sent via services such as e-mail, MMS (Multi-Media Message Service), or FTP (File Transfer Protocol).

Both categories of electronic messaging described above involve sending offline information, that is, information that has been written or otherwise compiled at a specific date and time and remains static when transferred through a messaging service. These existing options are sufficient for sending many types of data. However, in a constantly changing world, the need arises for the ability to transmit dynamic, or online, information.

This need is especially apparent when the data being transferred is dynamic in nature and is constantly being updated, such as in an online database.

For example, a financial consultant in a bank deals with customers or employees who are interested in the current value of stocks. This person needs the ability to send messages to other people, a list of all the available stocks including many online details about them: stock number, stock name, stock value, etc. Then, the addressee needs the ability to navigate through all this information and filter it until he finds the most suitable candidate stocks for investment. Then, he wants to reply the financial consultant with his selected stocks. The addressee can also send the information to another person for a second opinion. This messaging process can include an unlimited amount of addressees.

Prior art techniques of exchanging information are not practical for reviewing and navigating through hundreds or thousands (or even more) of stocks for investments, received as a text via E-mail or an SMS. Furthermore, this information is received in offline format such as files (like: text documents, electronic sheets, etc.), thus, part of this information may be already not relevant as the information has already been updated. In our example, an opened file that contains a list of stocks, the values of these stocks have probably changed in reference to the time the information was sent.

The present invention aims to provide a solution to the aforementioned problems by offering a method for transmitting online database query results to any person or group of people, in any language, in any domain of information, from any database, using any communication platform, over any computerized platform, and via any communication network. It is a further objective of the present invention to provide these results in a relevant and easy to use and easy to navigate format.

SUMMARY

According to the present invention is suggested a method for exchanging online data information messages between at least two computer terminal nodes through data communication networks. Said data information message includes a definition of online information data structure and query syntax. At least one terminal node is enabled to create said data information message by defining said data query, data information navigation techniques and information representation methods. All other terminals are enabled browsing and navigating through online data results and their graphical representation based on said information message definition wherein the data is retrieved from at least one common database.

The information navigation techniques include sorting, filtering, On-Line Analytical Processing (OLAP) operations and data-mining or data-warehousing techniques wherein logical equations can bed used as basis for any of said navigation techniques.

The information representation methods include summarized representation forms including: graph, a map, or a summary table and detailed representation form including a detailed records table.

The present invention disclose a data communication system for exchanging data information messages between at least two computer terminal nodes through data communication network wherein said data information message is a result of online data query retrieved from at least one common database. Said system comprised of data processing application which enable at least one terminal node to create said data information message by defining a data query syntax, navigation techniques to be applied on query results and information representations methods;

data browsing application enabling computer terminal nodes to browse and navigate through said data results and their graphical representation retrieved and manipulated according to the definitions of the information message.

data exchanging application enabling computer terminal nodes to send & save the current state of the filtered information message according to the definitions of the information message Information messages database wherein each message is identified by unique ID code, and classifying ID codes.

Data management application enabling storage and retrieval of information messages where the messages are classified according defined categories.

The information navigation techniques include sorting, filtering, On-Line Analytical Processing (OLAP) operations and data-mining or data-warehousing techniques wherein logical equations can bed used as basis for any of said navigation techniques.

The information representation methods include summarized representation forms including: graph, a map, or a summary table and detailed representation form including a detailed records table.

BRIEF DESCRIPTION OF DRAWINGS

These and further features and advantages of the invention will become more clearly understood in light of the ensuing description of a few preferred embodiments thereof, given by way of example only, with reference to the accompanying drawings, wherein—

FIG. 1A, FIG. 1B and FIG. 1C illustrate summarized representation methods, respectively including a Map, a Bar Graph, and a Summary Table, where the Count Aggregation Function counts the apartments for rent in each state and Information Navigation Techniques can be applied thereon in order to filter a smaller group of records.

FIG. 2 illustrates a detailed representation method as a data table that enables viewing the query data and selection of specific records, for the addressee's attention, by marking by the check box to the left, before messaging. In addition, each cell value can contain a hyperlink that leads to information that is more detailed, e.g. document, picture, etc.

FIG. 5A and FIG. 5B are illustrations of a Drill-Down through Summary Table—this summarized representation method enables applying Information Navigation Techniques.

FIG. 11 is an example of Modified Information Message object (major content) according to the present invention.

DETAILED DESCRIPTION OF THE PREFERRED EMBODIMENTS

The present invention provides a method for an Information Message Service (IMS) that enables information providers to distribute real-time, online database query results amongst information consumers in the form of information messages. An information provider may be an owner of any database. An information consumer may be any individual, using any communication platform over any computerized platform via any communication network, who wishes to access information from the information provider's database.

The term 'information message' refers to a message that differs from a text or file message in terms of the data represented in the message and the message structure.

An information message contains data that is a result of an online database query, from any domain of data, which includes an unlimited amount of records (rows), where each record has an unlimited amount of attributes (columns). Since the data of the information message relies on the result of an online database query, every time an information consumer opens such a message, s/he views online information.

The data within an information message is represented graphically. The message data may first be represented at a summarized level and may then be divided into categories. This helps the information consumer to easily navigate through massive amounts of online information by applying information navigation techniques. The information consumer may then filter the data to reduce the number of records and keep the most relevant ones. At any stage of the navigation and filtering process, s/he may also send the filtered message to another information consumer or to any application.

There are a number of information representation methods that may be used to represent data in an information message (as seen, for example, in FIG. 1A, 1B and 1C). The use of a summarized representation method is advantageous when the amount of data is very large, and may be used for creating aggregated information analysis. Such a summarized representation may be a graph, a map, or a summary table. The use of detailed representation methods (for example, as seen in FIG. 2) is advantageous when the amount of data is small enough to review, and contains all information about a current record or group of records. The user is enabled to navigate between the summarized representation forms to the detailed form.

Figure 3A:
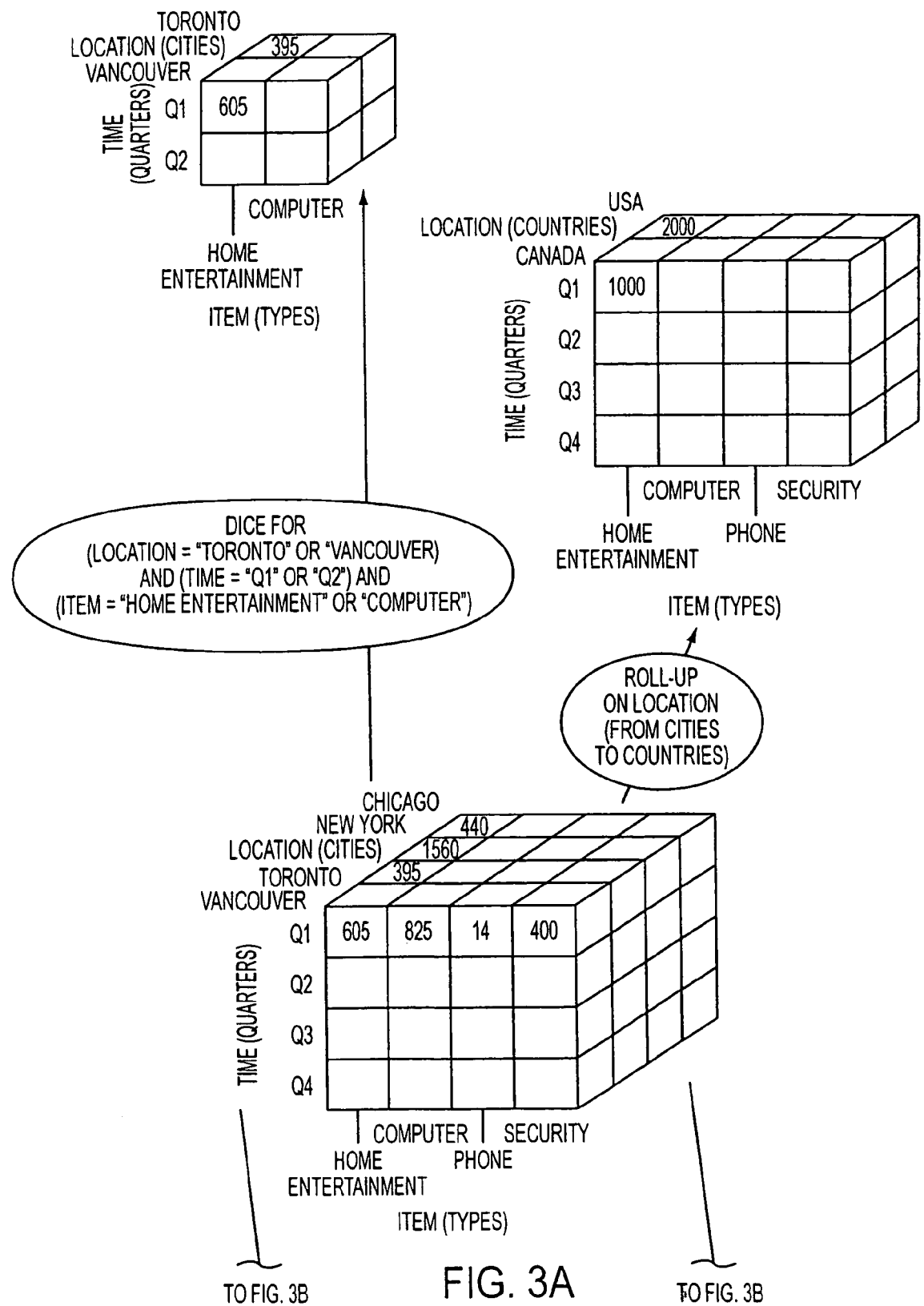
FIG. 3A and FIG. 3B illustrate several examples of typical OLAP operations on multi-dimensional data.
Figure 3B:
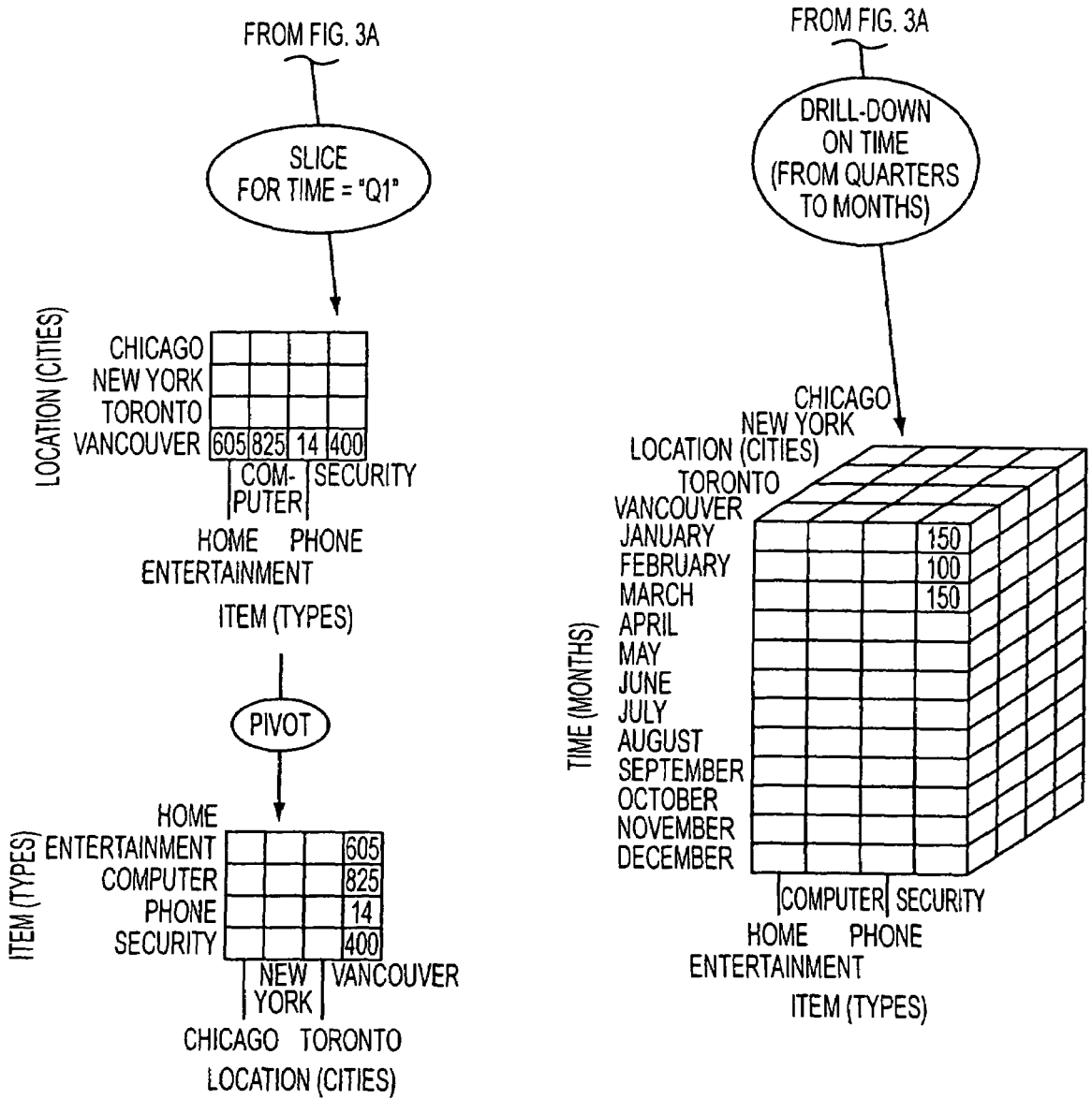
Figure 4A:
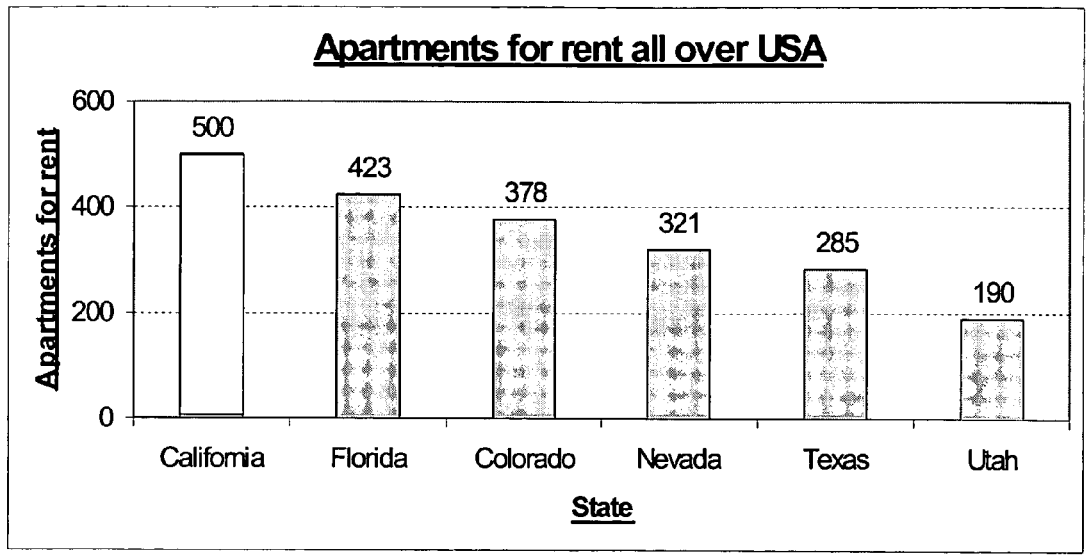
FIG. 4A and FIG. 4B are illustrations of a Drill-Down through Graph—this summarized representation method enables applying Information Navigation Techniques.
Figure 4B:
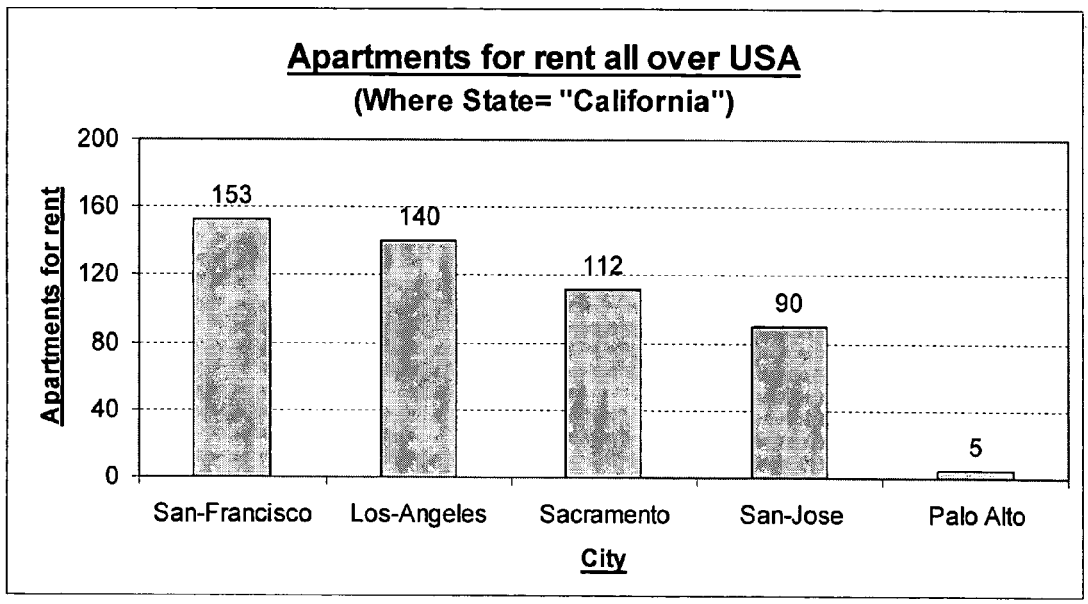

Finally, a number of information navigation techniques may be applied to an information message. A common technique is filtering, which requires the information consumer to specify criteria, usually in terms of ranges or values. The information message will then show only relevant records, i.e. records whose attributes match the values or are within the ranges given. Another information navigation technique is the use of On-Line Analytical Processing (OLAP) operations (see FIG. 3A and FIG. 3B). These are operations that allow manipulations such as drill-down, roll-up, dice, slice, pivot, or any other data-mining or data-warehousing techniques (see examples in FIG. 4A, FIG. 4B, FIG. 5A and FIG. 5B), over multi-dimensional data. Information navigation techniques also include the use of any mathematical functions or equations that can set a condition that will increase or decrease the amount of records the query result.

The method of the Information Message Service enables a messaging chain that can reach an unlimited number of information consumers. This method comprises of two sub-methods, each comprising of a number of steps.

The first sub-method is that of information message distribution. It supports the creation of an information message by an information provider. The provider may then send this message to an initial list of information consumers, who may then browse, analyze, navigate, and filter the information, and send it on to other information consumers or to any application. The steps of this sub-method are detailed below:

In order to create an information message, the information provider must first set the data scope of the information message. To do this, the information provider creates a database query out of multiple types of databases' tables and queries. This query may also be derived from multiple types of databases of different providers and may include also OLAP cubes, text files, etc. The query can be composed from any query language, e.g. relational query, multi-dimensional query or any other query. The result of the query holds the overall data scope contained in the information message.

Next, the information provider must set the message structure. This involves choosing the data representation method and information navigation techniques to be used with the information message. Choosing a representation method first requires indicating which attributes of a record will be included in each representation method and on each level (summarized or detailed) of representation. Then the information provider may choose the initial representation method that is most appropriate. To set information navigation techniques, the information provider designates relevant navigation techniques for each field or attribute chosen while setting the data representation method.

The next step in creating an information message is setting the level of security for the message. The message may contain non-secured information that anyone may obtain without providing information about him/herself, or secured information, meaning that only identified and authorized information consumers may view by entering a unique username and password.

Finally, the information provider must set the information consumers' privileges regarding the reduction of information representation methods and navigation techniques available for use with the information message. If an information consumer has the privilege to do this, s/he may limit the capabilities of the information message when sending it on to another information consumer.

Once the information message is created, the information provider may distribute the messages to a list of information consumers that s/he chooses. The information consumers receive the message in any messaging platform such as e-mail, SMS, or MMS.

When an information consumer opens an information message, the message is presented in one of two ways. If the message included offline information such as text or files as well as online information, the offline information is displayed first, and the information consumer must activate the online information by clicking a hyperlink or performing a similar action in order to view it. If the message contains only online information, then this contact will be displayed automatically upon opening the message.

After the online records are extracted and displayed on the information consumer's device, s/he may analyze the information represented with the predefined representation methods and using the predefined navigation techniques. Throughout this process, the consumer may switch between summarized and detailed representation levels or change the representation method to any other available method. The information consumer may also filter the results and mark specific records that s/he wishes to bring to the attention of the next addressee. Yet another available option is to save the current filtered results as a new information message, or export this data to any file format such as text files, documents, electronic sheets, database tables, or PDF files.

The information consumer may send any version of the information message—whether unchanged, filtered, restricted or modified—to another information consumer, a list of information consumers, or an application. If the information message is distributed to another information consumer or a group of information consumers, these consumers may again review, analyze or filter the message, and send it on to continue the chain. However, if the information message is not sent on or is only exported to an application, the information chain ends. Once the information message is browsed it appears at the same presentations formats as were defined by the sender (the last user in the messaging chain) and the last navigation techniques of the sender are applied.

The information consumer may also choose to send the information message as an offline message using XML (Extended Markup Language) technology. In this case, the addressee will receive a message that will not activate the relevant database query, but will carry the information message structure and all the data records. The addressee will have all of the capabilities to use any of the pre-defined information representation methods and to apply any of the pre-defined information navigation techniques on the offline data. However, this information consumer will be limited to viewing and sending only offline information in this information message.

Although the method described above can potentially result in the delivery of an information message to every information consumer in the world, it is likely that an information consumer will wish to review an information message that s/he did not receive. Therefore, the second sub-method offers the alternative of ordering an existing information message from the relevant information provider.

There are two ways in which an information consumer may request a specific information message. The first requires the consumer to know the identification number of the message. The consumer may contact the information provider and deliver the ID of the message s/he wishes to obtain. The information provider may then accept or deny this request depending on whether the consumer needs and/or has the proper authorization to view this information message. If the provider agrees with the request, s/he may send the appropriate information message via any service as mentioned above. The communication between the information consumer and provider may take place using any messaging platform. Once the consumer has received the information message, the chain process continues as in the first sub-method.

A second method for requesting an existing information message is through an information messages menu that may be published by the information provider. The information consumer may navigate this menu until s/he has found a specific information message that s/he wishes to receive and chooses it from the menu. This will trigger a transaction that will deliver the requested information message's ID number to the information provider, and the communication process continues as above.

The Information Messaging Service described in the present invention has a great advantage over existing services today; it has the capability to transfer dynamic information that is always relevant whenever the information message is opened. Some examples of possible applications for this service are in the field of finance and banking to keep track of currency rates, stock values, or payment transactions; in the field of retailing to control inventory levels; for use with large archives to find a list of newspapers articles or a list of patients' measurement details in hospital admission; or even for use by the military to closely follow information reported by agents, planes' sensor values, and so on.

The information messaging method as described above can be implemented in any communication environment such as Internet utilizing exiting email service, intranet network or cellular network utilizing SMS messages services.

The present invention suggests a system for implementing the Information Messaging System method described above. This system is described below. The technical specifications regarding the various stages of the IMS method are also included.

Figure 8:
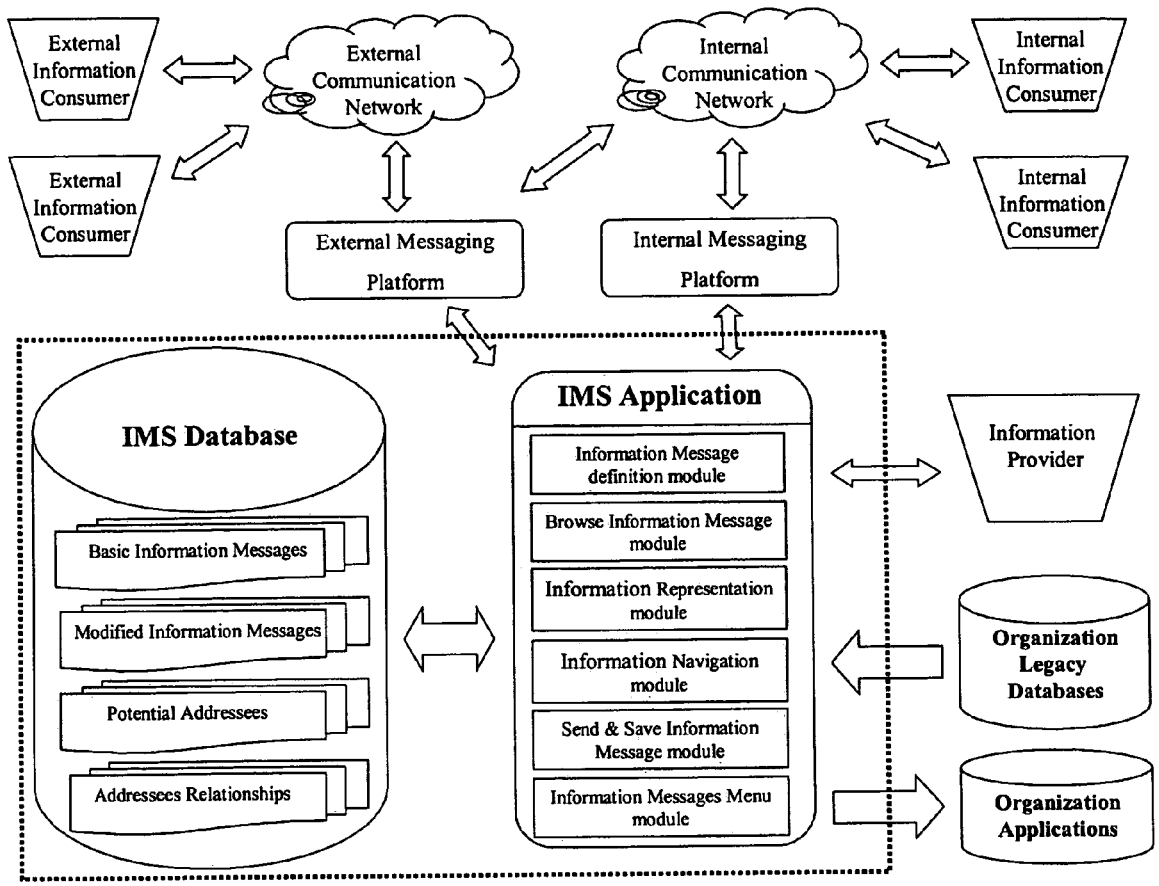
FIG. 8 illustrates a block diagram of the Information Message Service Architecture, as an enhancement to existing messaging platforms according to the present invention.
Figure 9:
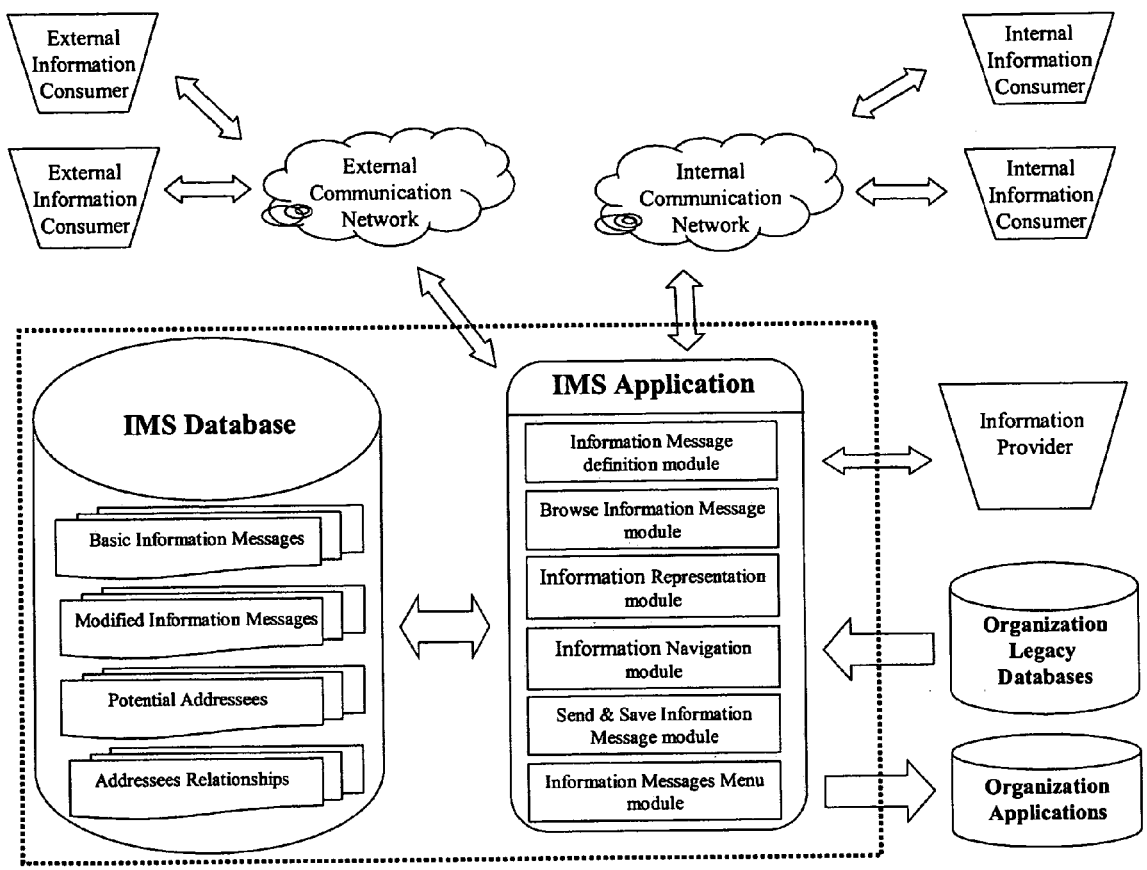
FIG. 9 illustrates a block diagram of Information Message Service Architecture, as an independent messaging system according to the present invention.

The environment within which the present invention is implemented is shown in FIGS. 8 and 9 and contains a number of different participants. The participants and their roles in this environment are each described below.

The information provider within the environment is a representative of the information provider described above. This representative uses the IMS application to create new information messages and launches the initial distribution to information consumers.

Two different networks are used within the IMS environment. The internal communication network is the private network used by the information provider's organization, e.g. the Intranet, and allows members of the organization to communicate and access organization files and applications. This network is usually protected by a firewall. The external communication network is the public network that connects the organization to non-members of the organization, e.g. the Internet, and allows anyone to communicate with members of the organization and access files and/or applications that are open to the public.

The IMS environment also contains internal and external messaging platforms. Internal messaging platforms are used by members of the internal communication network to send messages to each other within the organization. External messaging platforms allow members of the internal communication network and the external communication network to communicate through various types of messages including but not limited to e-mail, SMS, and MMS.

There are two types of information consumers in the environment in which the present invention is practiced. Internal information consumers are usually employees of the information provider's organization, but may be any person or group of people that have access to the information provider's internal communication network. These information consumers use an internal communication network to send and receive messages throughout the internal and external messaging platforms. Using the IMS system, they can do this without involving the organization information systems.

External information consumers are usually the organization's customers, potential customers, or suppliers, but may be any person or group of people that have access to the external communication network. These information consumers use the external network to send and receive messages containing database information, without involving the organization information system when using the IMS system.

Organization legacy databases include but are not limited to the organization's information-system databases. These databases can include various types of databases from various database providers such as SQL-Server, Oracle, Sybase, or DB2. Databases may also include Data-Warehouse and OLAP data cubes, various types of files, etc. When used within the IMS environment, these databases are queried by the IMS Application, using the IMS Database meta-data. These queries use Read-Only access mode. The result of the query is formatted to an Information Message structure and sent to the specified information consumer/s.

The term 'organization applications' refers to any application that accepts specified online content taken from an information message as an input. Internal and external information consumers can mark specific records within an information message and send them as a new message to the application as an input in order to initiate a transaction.

The IMS system may be implemented as an enhancement of existing offline messaging platforms or as an independent messaging system. The two preferred embodiments described by the present invention are defined by these two options. The first embodiment will hereafter refer to a system that enhances an existing platform, while the second embodiment will hereafter refer to an independent system.

The first preferred embodiment of the present invention enables any existing offline messaging platform to send an unlimited amount of online information records in addition to offline information such as text or files. The architecture of the system as described in this embodiment is shown in FIG. 8.

The second embodiment—referring to an independent messaging system—supports sending an unlimited number of online information records only, or messages containing online information records along with offline information. The architecture of the system as described in this preferred embodiment is shown in FIG. 9.

The basic architecture for both embodiments of the Information Message Service is described below.

Two major components make up the IMS system. The first component is the IMS database, which contains basic information messages created by the information provider, modified information messages sent by information consumers, contact details of potential addressees, and information regarding relationship schemes among the potential addressees.

Figure 10:
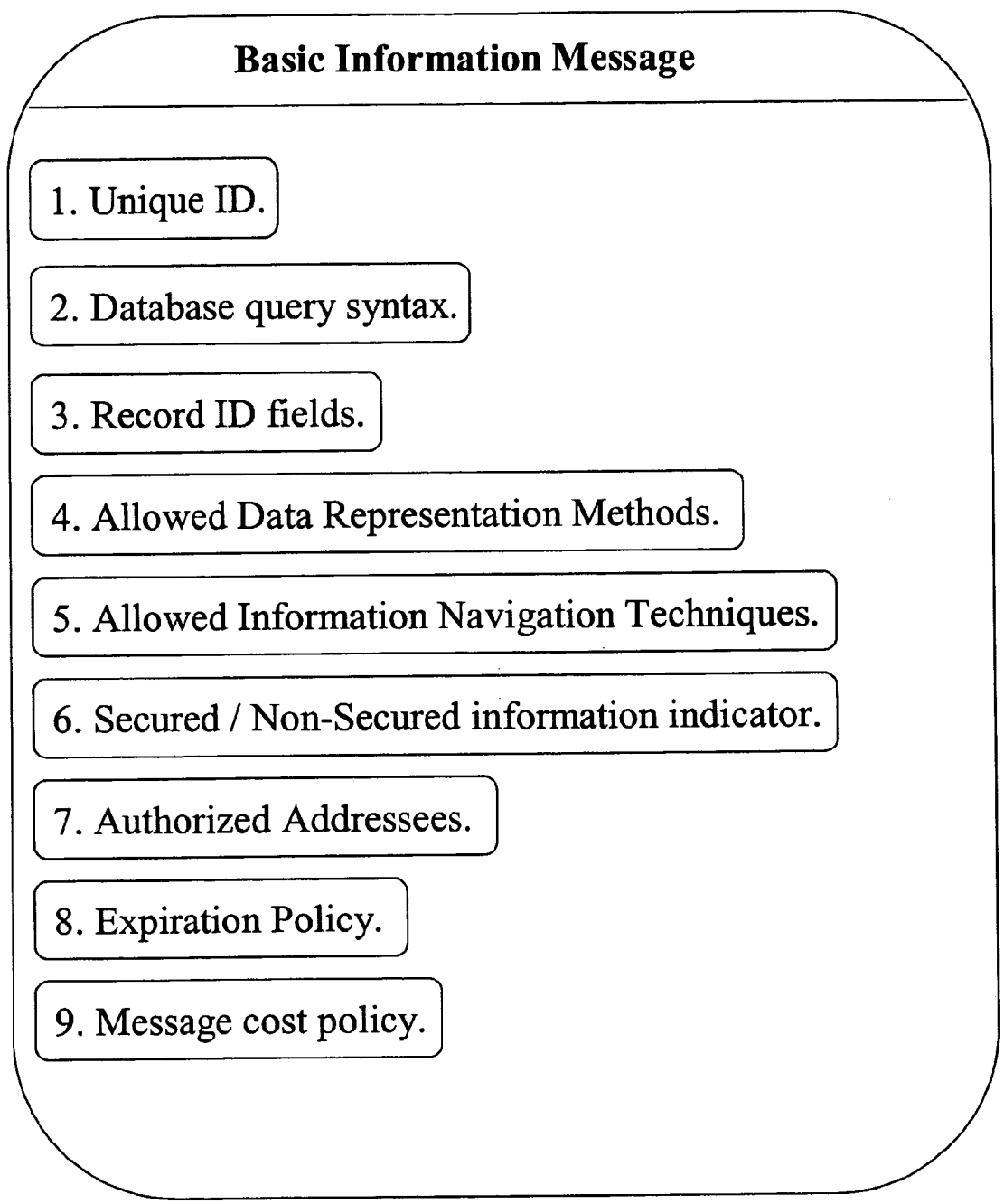
FIG. 10 is an example of Basic Information Message object (major content) according to the present invention.

Basic information messages in the IMS database are the first messages in a specific messaging chain that the information provider establishes. The query scope of the basic information message is the maximum information scope of the messaging chain. Each basic information message contains the following major elements, as shown in FIG. 10: a unique information message ID that identifies the specific message; database query syntax of any query language that extracts all of the information records; a group of record ID fields, wherein a combination of the values within the fields is an identifier for a unique record; allowed information representation methods, which define the initial, summarized, and detailed representation method that information consumers are able to view; allowed information navigation techniques, which define the navigation techniques that information consumers are able to use; an indicator whether the message is secured or non-secured, which defines whether an information consumer must enter a password to view the information message; a list of authorized addressees including authorized information consumers and applications; an expiration policy containing a list of terms which, when violated, will end the messaging chain availability; and a message cost policy defining a list of any applicable pricing rules for actions including but not limited to message viewing, navigation, or sending;

According to further embodiments of the present invention as will be described down below the information massage further includes a list of advertisement files with relevant rules for their dynamic presentation in the Information Message screen according to specific navigation techniques and representation methods that are applied by the information consumer; a list of scheduling rules for the distribution of the information message; and alert definition for transmission of a specific information messages upon occurrence of specific events.

Modified information messages in the IMS database are messages that are sent later in the messaging chain (after the basic information messages). The query scope of the modified information message is smaller than or equal to the scope of the basic information messages, due to navigation techniques applied by information consumers somewhere along the messaging chain. Each modified information message inherits all elements of the basic information ID of the messaging chain and contains the following additional major elements, as shown in FIG. 11: a unique information message ID; the ID of the basic information message from which the modified message has originated; additional database query syntax applied by previous information consumers in the messaging chain; the representation method last used by an information consumer in the messaging chain; the navigation technique last used by an information consumer in the messaging chain; a list containing the IDs of records marked by previous information consumers in the messaging chain; representation method limitations applied by previous information consumers in the messaging chain; navigation technique limitations applied by previous information consumers in the messaging chain; a list of addressees including information consumers and applications to which the information message was sent; the unique ID of the sender; an indicator of whether the information message contains online information or offline information; and finally, if the message information is offline, the offline message data is stored within the information message preferably in XML format.

The list of potential addressees within the IMS database may physically contain the addressee's data or contain links or queries to databases that maintain the information. Each addressee record in the list contains the following elements: addressee type, indication whether the addressee is an information consumer or an application; the addressee's unique address in a messaging platform or addresses in multiple platforms, e.g. an email address, SMS user ID, network IP, etc.; login and password information of the user; and a list of groups to which the user belongs.

Finally, the list of addressee relationships within the IMS database contains various relationship schemes among potential addressees. This object may physically contain the addressee's data or contain links or queries to databases that maintain the information. The list may contain hierarchical relationships such as an organization tree or E-mail address book, or any other form of addressee relationship representation. This object is useful for instructing the information messaging system to allow information consumers to send a message to a group addressee (e.g. an organization department or knowledge group), and to all addressees who are related to this group automatically. If an existing addressee is removed from this group (i.e. is no longer related to the group according to the relationship list), this addressee will not receive an information message sent to the group and any request to access previous sent information messages will be denied. Likewise, a new addressee joining the group will automatically receive all information messages sent (or that is to be sent) to this group. The sender also has the option to choose to send the information message to specific addressee\s from the relationship scheme if so inclined.

The second component of the IMS system is the IMS application, which handles all requests made by the information provider for creating and distributing information messages, updating addressee details and relationships and maintaining the IMS database. The IMS application also handles requests made by information consumers for browsing and navigating information, and for ordering and sending information messages.

The IMS application contains the following major modules (see FIGS. 8, 9):

The Information Messages Definition module allows the Information Provider's representative, usually the Organization Information Technology Manager, to create new Information Messages which are saved in the IMS database as Basic Information Messages objects.

The Browse Information Messages module is responsible for uploading secured or non-secured Information Messages, requested by Information Consumers. The IMS system executes Read-Only queries to the Information Provider databases in order to retrieve the online content of the Information Message.

The Information Representation module builds the Information Message graphic structure according to the Information Consumers requests, e.g. choosing a summarized representation method (graph, map, summary table) or a detailed representation method (data table), etc.

The Information Navigation module enables Information Consumers to apply Information Navigation Techniques on the Information Message data, e.g. filters, drill-down operations, etc.

The Send & Save Information Messages module enables an Information Consumer to send secured or non-secured Information Message to any addressee and enable an information provider to launch the initial distribution of an information message. This message object is saved to the IMS database with all the relevant details as a Modified Information Message object.

The Information Messages Menu module enables Information Consumers to choose and receive an existing Information Message from a list of Information Messages that the Information Provider offers.

According to further improvement suggested by the present invention, the Information Provider might set preliminary specific Information Representation Methods for different computerized platforms. The information message representation method is automatically changed in accordance with each Information Consumer computerized platform, since there is a need to match the representation methods to the computerized platform capabilities. For example, a Graph can hardly be viewed in cellular-phones, since the screen size is small. Therefore, the best summarized representation method for small screens might be a Summary Table (as seen in FIG. 5). On the other hand, desktops have large screens and therefore can be assigned Graph or Map summarized level representation methods. The Information Provider might also set preliminary definitions of specific information navigation techniques adapted for different computerized platforms capabilities.

Figure 6:
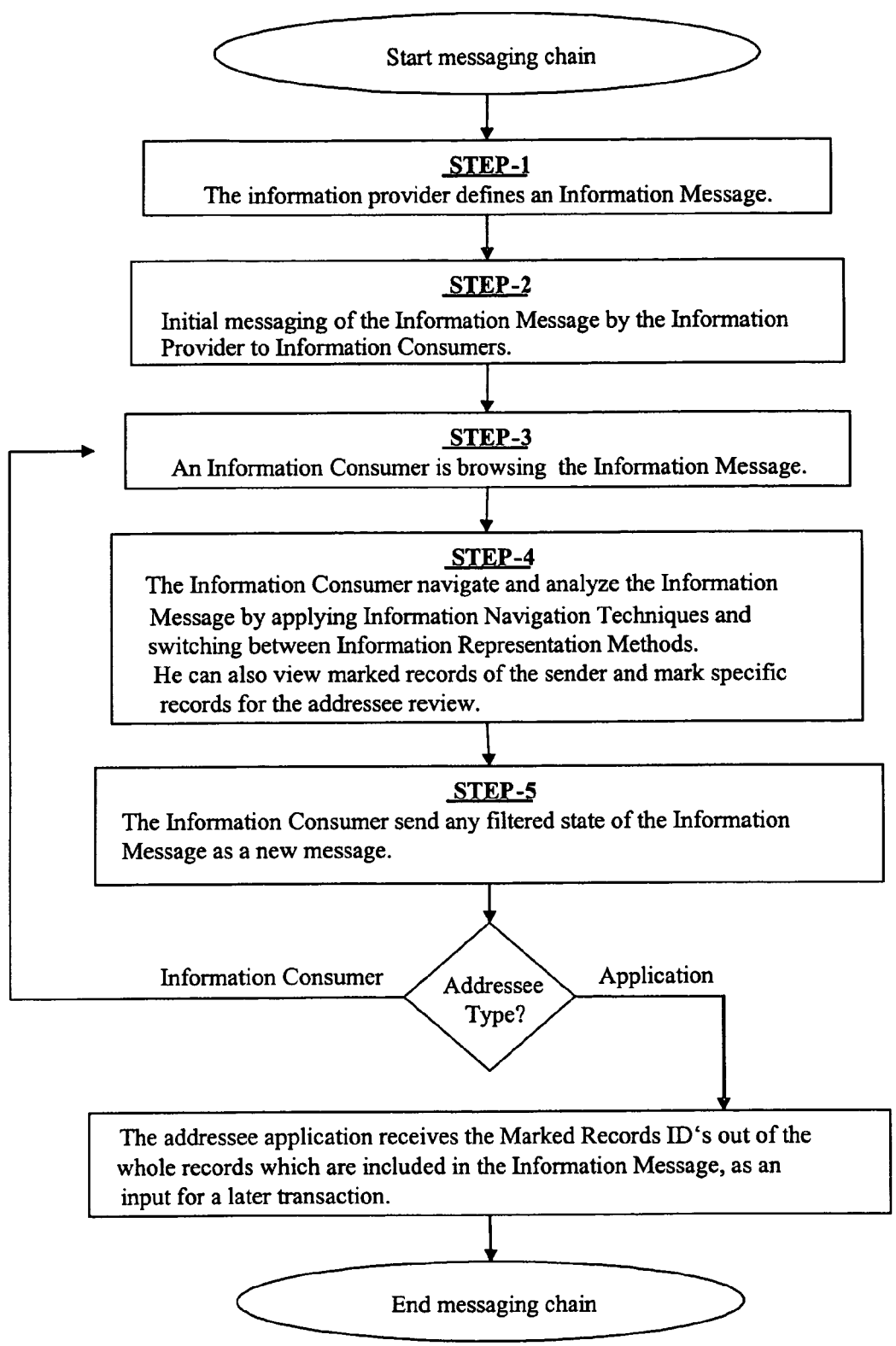
FIG. 6 illustrates a flowchart of Information Messages creation and distribution (major method of IMS) according to the present invention.
Figure 7:
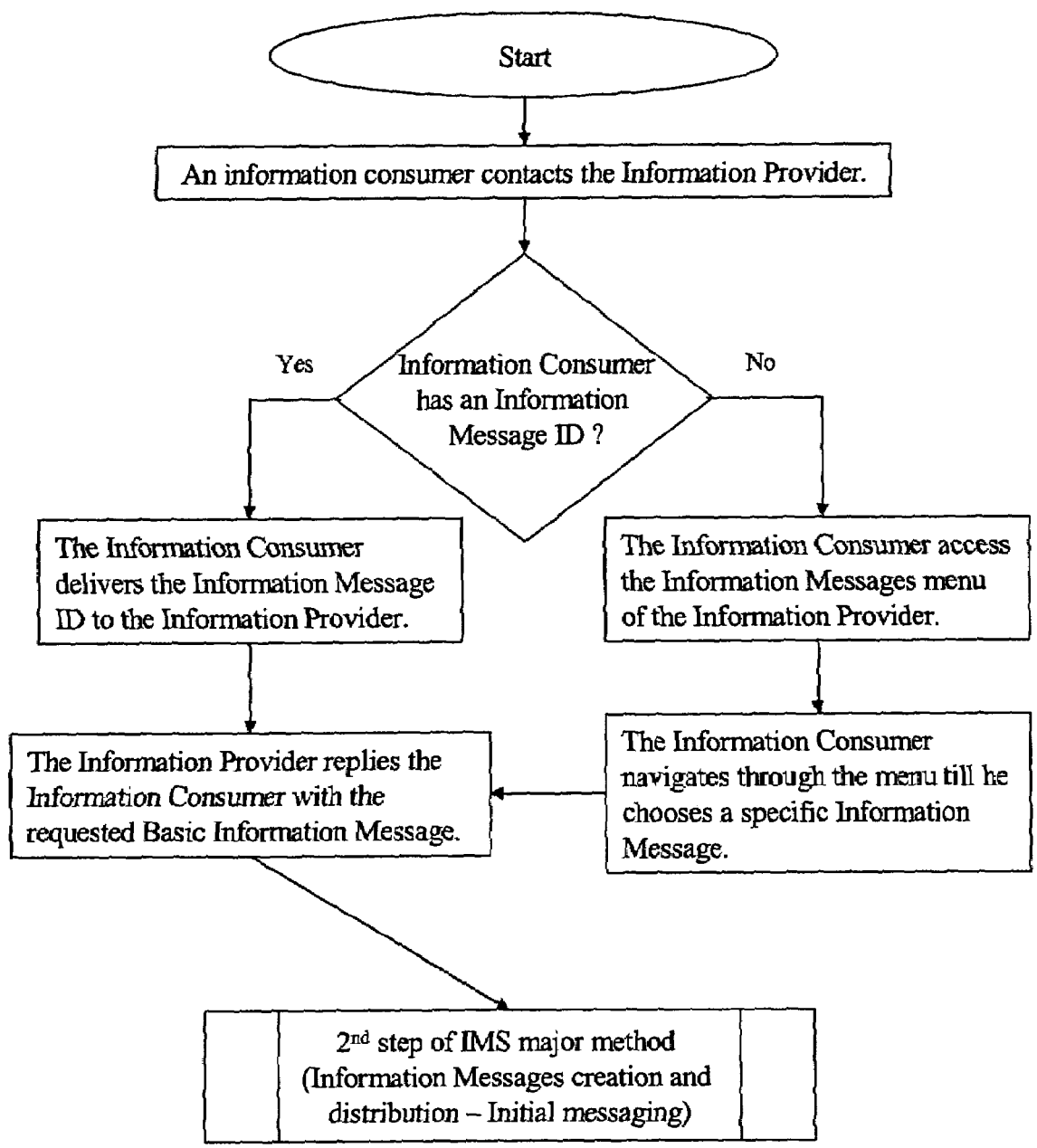
FIG. 7 illustrates a flowchart of Ordering an existing Information Message (minor method of IMS)

Technical explanations of IMS processes in relation to the IMS method are detailed below. The major methods of IMS—Information Messages creation and distribution, are displayed in FIG. 6. The minor method of IMS, ordering an existing Information Message, is displayed in FIG. 7.

The first step in the IMS major method of Information Messages creation and distribution is to define the Basic Information Message. The Information Provider defines a new Information Message using the Information Message definition module (of the IMS application). A new object of Basic Information Message is added to the IMS database with all its basic elements.

The next step is to send the initial message. The Information Provider sends the Basic Information Message to an initial list of addressees, using the Send & Save Information Message module of IMS application. A new object of Modified Information Message is added to the IMS database with all its basic elements. The IMS application creates a link in the sent message, which contains both the IMS Application URL and the Modified Information Message ID. This link can be a Hyperlink, a file, etc. and is used for activating the connection with the IMS application for uploading the online content of the Information Message. After sending the Information Message, the Modified Information Message object is being updated with the actual addressees list.

Figure 12:
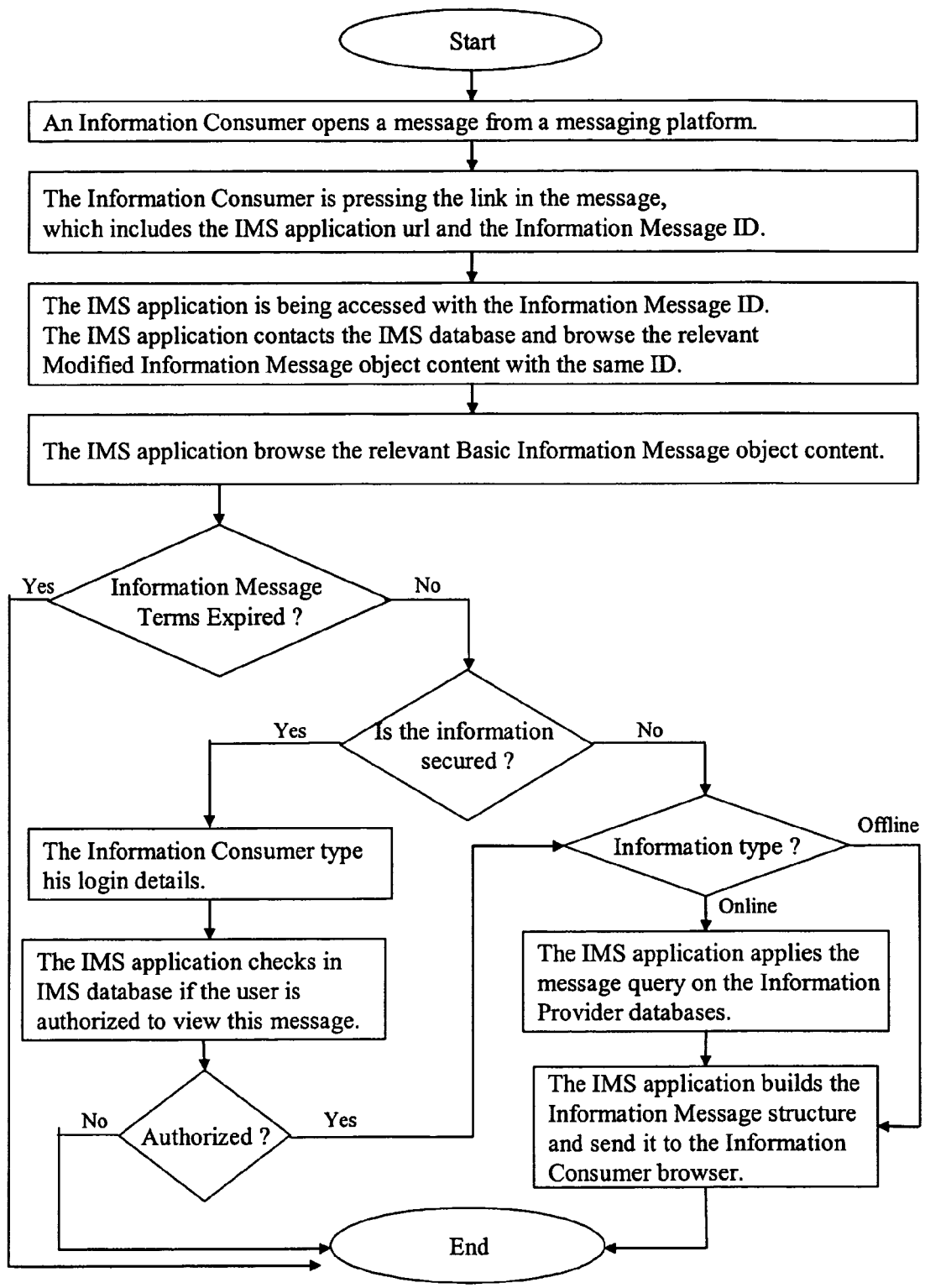
FIG. 12 illustrates a flowchart of the Browsing Information Message process according to the present invention.

After sending the message, the message browsing process, displayed in FIG. 12, begins. After opening a message from any messaging platform, the user activates the online content by pressing the link inside the message. If the message contains online data only (e.g. no text or attached files) then the online content may be activated immediately without user interference. Upon activation, a browser or any window is launched and contacts the IMS application with the Information Message ID. The IMS application (Browse Information Messages module) browses from the IMS database the Modified Information Message with the same Information Message ID and the relevant Basic Information Message.

The following actions are taken in order to browse the Information Message data: Firstly, the Basic Information Message object is checked for Expiration. If the Expiration Terms have been violated, then the Information Message will not be browsed.

Thereafter, the Basic Information Message object is checked for having Secured/Non-Secured information.

If the information in the message is secured, the Information Consumer is asked to type his secured ID (usually a Login and a Password) in order to view the Information Message. In this case, the query data is filtered by the Information Consumer ID (e.g. each Information Consumer can see only his phone call details in a phone bill Information Message, even if this Information Message is messaged to another Information Consumer).

The IMS application searches if the Information Consumer is authorized through the Basic Information Message authorized addressees list. If so, the IMS application adds the additional query syntax from the Modified Information Message object to the database query syntax of the Basic Information Message object and goes to the next step.

If the message information is not secured, then the IMS application proceeds to the next step.

If the Modified Information Message is set to be online, the IMS application applies the message query (as described above) on the Information Provider databases. If it is set to be offline, the IMS application browses the offline message data from the Modified Information Message object.

The IMS application retrieves from the message object the following definitions: the last Information Representation Method, the last applied Information Navigation Techniques, the defined limitations for the current user, and the Marked Records ID's of the message. Finally, the IMS application builds the Information Message structure based on the retrieved definitions as specified below, and sends it to the Information Consumer network browser. The last Information Representation Method (e.g. graph, summary table, data table, etc.) is loaded in a graphic mode. The Information Message records are presented using this graphic representation method, e.g. in a Summarized level or a Detailed level.

The last Information Navigation Techniques take effect, e.g. filtered fields with their ranges, drilled-down fields with their drilled values, etc.

The Marked Record IDs of the message are presented, parallel to the information records representation and the navigation process.

The Information Navigation and Analysis step allows the Information Consumer to navigate through the message information and analyze it. The Information Consumer can change representation methods (using Information Representation module), while he is bound both by the Allowed Information Representation Methods as set by the Information provider (Basic Information Message object) and by the Limitations on Information Representation Methods (Modified Information Message object) which were set by the last sender.

The Information Consumer can apply Information Navigation Techniques (Information navigation module), while he is bound by the Allowed Information Navigation Techniques which were set by the Information Provider (Basic Information Message object) as well as the Limitations on Information Navigation Techniques (Modified Information Message object) set by the last sender.

The Information Consumer can mark specific records and unmark records marked by the sender.

The actions above do not affect the other addressees who received the same Information Message.

If the Information Message contains offline information records, the user can switch to online view, only if he is authorized.

If the IMS system is used as an independent messaging system (see FIG. 9), Information Consumers can save any filtered state of the Information Message after it was browsed and navigated as a draft, using the Send & Save Information Message module. A new Modified Information Message object is created and sent to this Information Consumer. This action is the same as an Information Consumer sends an Information Message to himself.

Figure 13:
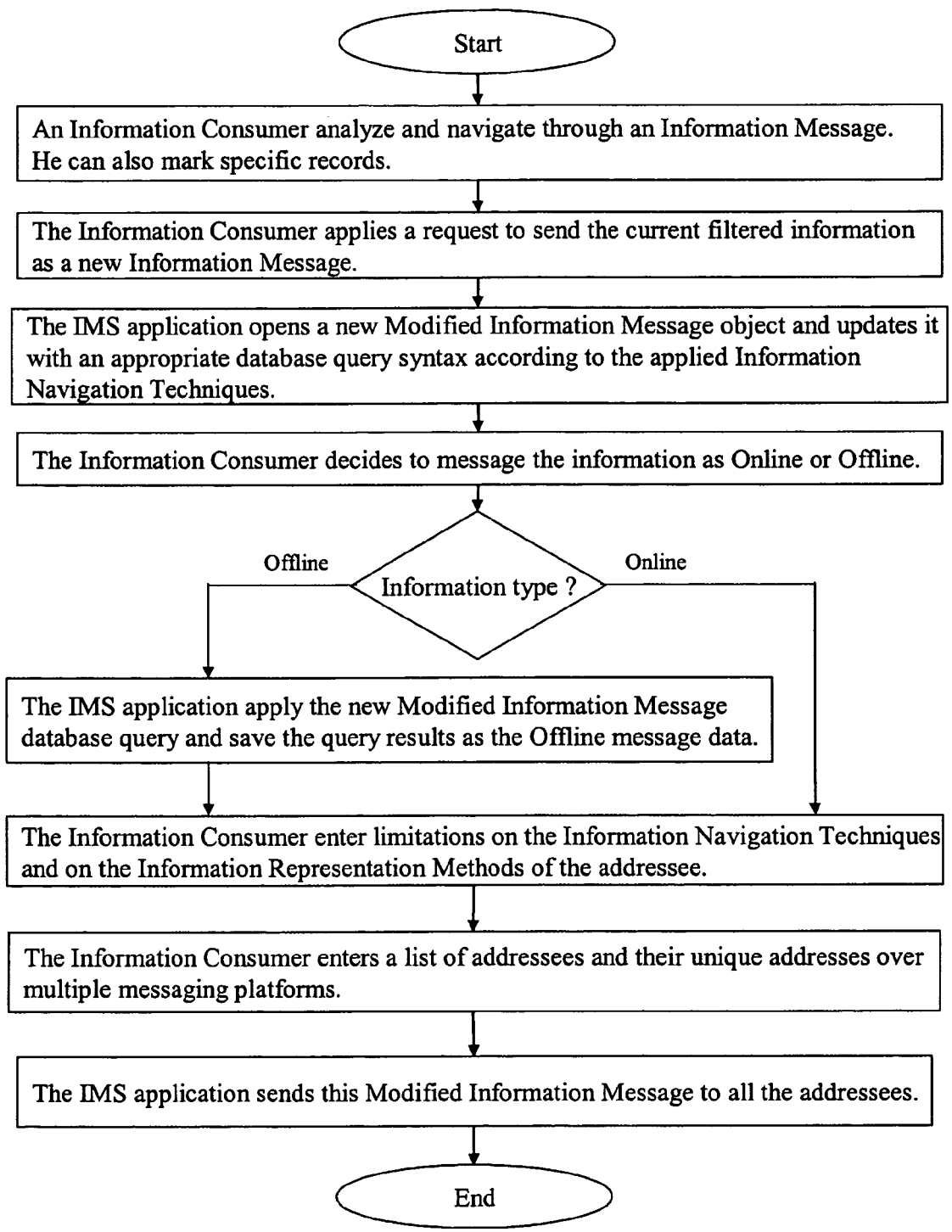
FIG. 13 illustrates a flowchart of the Sending Information Message process according to the present invention.

The Information Message sending step is displayed in FIG. 13. After navigating and filtering the Information Message, the Information Consumer applies a request to send the filtered information as a new message using the Send & Save Information Message module. Before the Information Message data is sent several options are available to the user: The Information Consumer is enabled to select whether to send the modified information message, as Online or Offline. If the choice made is to send the online content as offline information, the IMS application applies the new Modified Information Message database query to the Information Provider databases and saves the query results as the Offline message data (e.g. using XML technology, etc.) in this object.

Additionally, the Information Consumer can set limitations on the Information Navigation Techniques and the Information Representation Methods, which are allowed for the addressees.

Another option available to the Information Consumer is to enter a list of addressees and their unique addresses over multiple messaging platforms. Choosing an addressee and sending him/her an Information Message can be done via any communication networks, by the unique messaging platform address. Choosing an Addressee is done by typing or selecting a single or group of unique messaging platform address code. Any messaging platform user address can be used, for example: E-mail address, SMS user ID, the IMS independent messaging platform user address, a cell phone number if the target is a cellular phone or the addressee IP number if the target is an interactive TV over a cable network address. At the end of the this preparation process the IMS application creates a new Modified Information Message object and updates it with additional database query syntax according to the applied Information Navigation Techniques, which were added to the query of the Basic Information Message. After sending the Information Message, the Modified Information Message object is updated with the Actual Addressees list, the marked records ID's list and the sender ID.

Ultimately, the Modified Information Message is sent to all the addressees over multiple messaging platforms.

If the addressee is an Application, the Marked Records data will be sent to the Application in a specific format. This format will be defined in the first stage of the major IMS method (Information Message creation and definition), for each Application Addressee. For example, if the Information-Message includes a product catalog, a relevant Application addressee might be a Billing Application. Each Information Consumer will navigate through the catalog, then switch to a detailed level and check the items he is interested in purchasing. Then, after messaging the information, the IMS application communicates with the billing application, delivering the pre-defined fields needed to start the purchasing process (e.g. the selected product ID's, etc.). Using the product ID, for example, the Billing Application can start the purchasing transaction for the products chosen by the Information Consumer.

The IMS minor method of ordering an existing Information Message (FIG. 7) allows the Information Consumer to contact the IMS application (Information Message Menu module) of the Information Provider for ordering an Information Message. The following actions are taken for ordering an Information Message:

First, if the Information Consumer has the Information Message ID, he delivers it to the IMS application. Delivering this number differs according to the computerized platform under use. For example, if the Information Consumer places the order by cellular phone, he dials "*799" on his cellular phone to request Information Message no. 799. In another case, if the Information Consumer contacts the Information Provider over the Information Provider website, he can type "799" on the web page to order the specific Information Message.

If the Information Consumer does not have an Information Message ID, he chooses an Information Message from the Information Provider's menu of Information Messages. The chosen item in the menu has a link with an Information Message ID number. The chosen information message is retrieved and sent to the information consumer.

Since the Information Providers are delivering pre-defined messages that were not modified by Information Consumers, they actually send the Basic Information Message objects. Therefore, the chosen Information Message ID is used to retrieve a Basic Information Message object with this unique ID.

From this point, the messaging process continues to the Information Messages creation and distribution—Initial messaging step as described in the major method of IMS.

According to additional option of the present invention, it is suggested to add a scheduler module to the present invention system. Such modules enables the user to set time schedule for sending a specific information message. Hence, the user can receive updated reports at pre-determined time periods.

According to additional option of the present invention it is suggested to add advertisements to the information message. The advertisements can be dynamically replaced using and advertisement module in accordance to message content and user navigation operation. For example, if the user has filtered records of specific issue the relevant advertisement are attached.

Another option of the present invention includes an alert module enabling to send information massages upon the occurrence of specified events. For example, the user can define to request stock report information message when a specific stock reached a certain value.

According to the present invention, it is suggested that definition of scheduling or alerting information messages are preformed by the information provider.

Another option of the present invention includes the ability to add comments to each one of the records, which are included in the information message query' result. In this case, each comment is saved in the IMS database in the modified information message object and will be related to the relevant record by the record unique ID fields. Another option of the present invention includes the ability to define a data Information Message as a combination of existing Information Messages. In that case, the new information message will contain the basic information messages ID's and will inherit all the definitions of these information messages.

The method and system according to the present invention may be implemented as an independent application or as integral part of any information system, any communication platform or any application.

While the above description contains many specifities, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A method for
representing content data on at least one of first computer terminal nodes, wherein said content is stored in at least one database server and wherein the represented content data is defined at a second computer terminal node, said method comprising:
creating at least one information message by one of said second computer terminal nodes, wherein said information message includes information about at least one of the following group;
structure of the content data retrieved by said second computer terminal node; query syntax that corresponds to the content data retrieved by said second computer terminal node; navigation techniques according to which said content data has been retrieved by said second computer terminal node; and type of forms according to which said content data is represented;
transmitting said created information message from said second computer terminal node to at least one of said first computer terminal nodes;
retrieving said content data by at least one of said first computer terminal nodes from said database server according to said received information message; and
processing the content data retrieved by one of said first terminal nodes according to said data information message.

2. The method of claim 1 wherein the information navigation techniques include sorting, filtering, On-Line Analytical Processing (OLAP) operations and data-mining or data-warehousing techniques wherein logical equations can he used as basis for any of said navigation techniques.

3. The method of claim 1 wherein said content data is represented in at least one of the following formats: a graph, a map, or a summary table and detailed representation form in format of data records table.

4. The method of claim 1 wherein the creation of said

5. The method of claim 1 wherein the creation of said information message is processed by data management application.

6. The method of claim 1 wherein said information message transmission is performed via wired electronic data message exchange communication platform.

7. The method of claim 1 wherein the transmission of said information message is preformed via wireless electronic data message exchange communication platform.

8. The method of claim 1 wherein said first and second computer terminal nodes are further enabled to perform online analytical or statistical manipulations or calculations of the information message.

9. The method of claim 1 wherein said second computer terminal nodes are enabled to create modified information messages by manipulating originally received information messages according to an input of a user, said manipulation including any analytical or statistical calculations, applying information navigation techniques, creation of new graphical representation of the data query result and emphasis of parts of the information data.

10. The method of claim 1 wherein said information message is recorded with an identifying unique ID, original message ID and arc classified within at least one database.

11. The method of claim 10 wherein each information message includes a defined authentication list including all terminal or user addresses which are allowed to receive said information message wherein said list has organized structure representing classified group addresses.

12. The method of claim 11 wherein users which are excluded from a specific classified group are denied from browsing old information messages which they received as part of this specific group.

13. The method of claim 11 wherein the authentication checkup is performed each time a request for retrieving information message is issued, in order to prevent users whose authentication has expired from browsing information message that has been defined at a time said users were authorized.

14. The method of claim 10 wherein for each information message is a defined distribution list including destined terminal or user addresses wherein said list has organized structure representing classified group addresses.

15. The method of claim 10 wherein for each information message corresponding security encoding parameters are defined, which define access rules for all terminal or user addresses.

16. The method of claim 10 wherein for each information message corresponding cost policy rules are defined, which determine the costs of retrieving respective information message, navigating said information message, changing representation method of said information message or forwarding said information message.

17. The method of claim 10 wherein said information message is a combination of existing data information messages.

18. The method of claim 10 wherein said information message further contains comments of each user for each of one of the records, which are included in the message query result.

19. The method of claim 10 wherein the information messages are transmitted in an offline node maintaining the information data structure and graphical representation properties.

20. The method of claim 10 wherein the information message can be sent to an application addressee where the data of the highlighted records, marked by the sender, will be transferred to it for a later transaction.

21. The method of claim 1 wherein said information messages are created in advance according to predefined queries (and manipulations) and are available from at least one communication node, organized according to predefined categories.

22. The method of claim 21 wherein at least one of said first computer terminal nodes enables the users search for information messages.

23. The method of claim 21 wherein at least one of said first computer terminal nodes enable users to request specific information messages, and wherein at least one of said first computer terminal nodes is adapted to retrieve the requested information messages.

24. The method of claim 1 wherein said information messages further include text and files, maintaining the information data structure and graphical representation properties.

25. The method claim 1 further comprising the ability to automatically change the representation formats and navigation techniques of said information message in accordance to browsing capabilities of the receiving terminal node.

26. The method of claim 1 wherein said information message further comprises hyperlinks for relevant information not included within the respective database of the original information message.

27. The method of claim 1 wherein said information message further comprises advertisements wherein the advertisement content is online updated in accordance to the content data and the navigation operations applied by users.

28. The method of claim 1 wherein said second computer terminal node is enabled to set schedule for retransmission of specific information messages.

29. The method of claim 1 wherein said second computer terminal node is enabled to set alert definition for transmission of specific information messages upon occurrence of specific events.

30. The method of claim 1 wherein said information message as browsed by each user appears at the same presentations formats as were defined by the last user in the messaging chain, wherein the same navigation techniques are applied as were defined at said second computer terminal node.

31. The method of claim 1 wherein the method is implemented as part of any information system, any communication platform or any software application.

32. The method of claim 1 wherein the computerized terminals are portable or stationary computerized devices.

33. The method of claim 1 wherein the computerized terminals are wireless computerized devices.

34. A data communication system that enables representing content data on at least one of first computer terminal nodes, wherein said content is stored in at least one database server and wherein the represented content data is defined at a second computer terminal node, said method comprising:
  a creating application for creating at least one information message by said second computer terminal node, wherein said information message includes information about at least one of the following group:
    structure of the content data retrieved by said second computer terminal node; query syntax that corresponds to the content data retrieved by said second computer terminal node; navigation techniques according to which said content data has been retrieved by said second computer terminal node; and type of forms according to which said content data is represented:
  a transmission application for transmitting said created information message from said second computer terminal node to at least one of said first computer terminal nodes;
  a retrieving application retrieving said content data by at least one of said first computer terminal nodes from said database server according to said received information message; and
  processing the content data retrieved by one of said first computer terminal nodes according to said data information message.

35. The system of claim 34 wherein the information navigation techniques include sorting, filtering, On-Line Analytical Processing (OLAP) operations and data-mining or data-warehousing techniques wherein logical equations can be used as a basis for any of said navigation techniques.

36. The system of claim 34 wherein the information representation methods include summarized representation forms of said content data in format of at least one of the following: a graph, a map, or a summary table and detailed representation form in format of data records table.

37. The system of claim 33 wherein said information message transmission is preformed via wired electronic data message exchange communication system.

38. The system of claim 34 wherein said information message transmission is preformed via wireless electronic data message exchange communication system.

39. The system of claim 34 wherein said content data processing application further enables performing online analytical or statistical manipulation or calculations of said content data.

40. The system of claim 34 wherein said content data processing application further enables computer terminal node end users to create modified information messages by manipulating the originally received information message; said manipulation including any analytical or statistical calculations, applying information navigation techniques, creation of new graphical representation of the content data and emphasizing parts of the content data.

41. The system of claim 34 wherein an authentication list is included in each information message, said authentication list indicating therein addresses which are allowed to receive said message, wherein said list has organized structure representing classified group addresses.

42. The system of claim 41 wherein users which are excluded from a specific classified group are denied from browsing old information messages which they received as part of this specific group.

43. The system of claim 41 wherein the authentication checkup is preformed each time the information message is browsed preventing users which their authentication has expired to browse information message which were defined at the period they where authorized.

44. The system of claim 34 wherein for each information message a distribution list is defined, said distribution list indicating therein destination addresses wherein said authentication list has organized structure representing classified group addresses.

45. The system of claim 34 wherein each information message is defined by security encoding parameters which define access rules for all terminal or users addresses.

46. The system of claim 34 wherein the information messages are created in advance according to predefined queries and manipulations and are available from the second computer terminal node, organized according to predefined categories.

47. The system of claim 46 wherein the computer terminal nodes are adapted to enable the user to search for content data.

48. The system of claim 46 wherein at least one of said first computer terminal nodes are adapted to enable users requesting for specific information messages and wherein at least one of said first computer terminal nodes receive the requested information messages.

49. The system of claim 34 wherein the information messages are transmitted in an offline mode maintaining the structure of the content data and graphical representation properties.

50. The system of claim 34 wherein for each information message cost policy rules are defined which determine the costs of at least one of the following: retrieving respective information message, navigating said information message and forwarding said information message.

51. The system of claim 34 wherein the information messages further include text and files, maintaining the structure of the content data and graphical representation properties.

52. The system of claim 34 further comprising the ability to automatically change the representation formats and navigation techniques of said information message in accordance to browsing capabilities of the receiving terminal node.

53. The system of claim 34 wherein the information message further comprises hyperlinks for relevant information not retrieved from respective databases according to the information message.

54. The system of claim 34 wherein the information message further comprises advertisements wherein the advertisement content is online updated in accordance to the content data and the navigation operations applied by the user.

55. The system of claim 34 further comprising a scheduler module wherein the information provider is enabled to set schedule for retransmission of specific information messages.

56. The system of claim 34 further comprising an alert module wherein the information provider is enabled to set alert definition for transmission of specific information messages upon occurrence of specific events.

57. The system of claim 34 wherein the information message as browsed by each user appears at the same presentations formats as defined at the second computer terminal node and wherein the same navigation techniques are applied as were defined by the second computer terminal node.

58. The system of claim 34 wherein the system is implemented as integral part of any information system, any communication platform or any application.

59. The system of claim 34 wherein said first and second computer terminal nodes are portable or stationary computerized devices.

60. The system of claim 34 wherein said first and second computer terminal nodes are wireless computerized devices.

61. The system of claim 34 wherein said first and second computer terminal nodes includes an interactive TV, touch screen or any electronic screens.

62. The system of claim 34 wherein the Information Message is a combination of existing Information Messages.

63. The system of claim 34 wherein the information message further contains comments of each user for each of one of the records, which are included in the message query result.

64. The system of claim 34 wherein the information message can he sent to an application addressee where the data of the highlighted records, marked by the sender, data will be transferred to it for a later transaction.

* * * * *